Oct. 19, 1971     G. F. HOUGHTON     3,613,466
AUTOMATIC GEARSHIFT FOR BICYCLE
Filed June 22, 1970
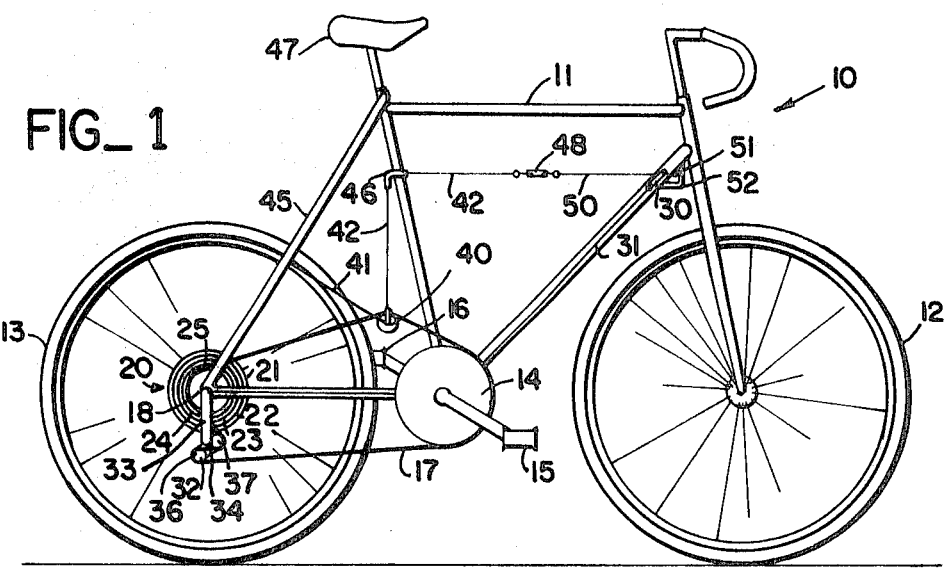
INVENTOR.
GEORGE F. HOUGHTON
BY
ATTORNEYS United States Patent Office 3,613,466
Patented Oct. 19, 1971

3,613,466
AUTOMATIC GEARSHIFT FOR BICYCLE
George F. Houghton, 650 Gerona Road,
Stanford, Calif. 94305
Filed June 22, 1970, Ser. No. 48,012
Int. Cl. F16h 9/00, 11/06
U.S. Cl. 74—217 B                    12 Claims

ABSTRACT OF THE DISCLOSURE

A bicycle having a manually operated gearshift is converted to an automatic shift dependent upon the pedal pressure used to propel the bicycle. The drive chain engages a special shift-control wheel which is attached to a first cable that goes to the frame and to a second cable that goes up vertically, then turns horizontally, and is attached, preferably through a turnbuckle, to the manual gearshift lever. Also attached to this gearshift lever is a spring which is anchored to the frame forward of the gearshift lever. The pedal pressure exerted through the drive chain tends to pull the special shift-control wheel down and to pull the shift lever back; this pressure is opposed by the spring attached to the gearshift lever, which tends to pull the shift-control wheel up and to pull the shift lever forward. Thus the amount of effort needed to move the drive chain acts to vary the position of the gearshift lever. The gearshift lever operating through its usual shift mechanism, such as a typical derailleur, does the actual shifting of the gears.

BACKGROUND OF THE INVENTION

This invention relates to an automatic gearshift for bicycles, tandems, and similar pedal-pressure driven vehicles, the automatic gear selection depending on the effort required to propel the vehicle.

Bicycles with change-speed gears are well known, but up to now, most of the shifting has been done manually. Manual shifting, when located on the frame, requires the bicycle rider to take one hand off the handlebars whenever he wishes to change gears, and sometimes the proper time to shift comes at a very inconvenient moment. Manual shifting also has the inconvenience of the rider having to make up his mind each time whether he wants to shift, thereby occupying a disproportionate amount of his thinking and limiting his enjoyment of the ride. Furthermore, some riders shift either too soon or too late to get the best total effort out of the bicycle.

SUMMARY OF THE INVENTION

The present invention automatically shifts the bicycle drive chain from one ratio of gear sprocket to another, depending upon the effort required to move the drive chain. It operates in combination with a standard manually operated derailleur by automatically regulating the position of the gear shift lever in accordance with the pressure exerted on the pedals. Thus, if the bicycle is being ridden uphill and the pull is a hard one, the device automatically shifts to a lower gear. If the bicycle is being ridden on the level or on a downhill slope, the automatic shift is made to a higher gear.

The invention includes a special shift-control wheel which engages the upper reach of the drive chain and is held in that engagement with the aid of two cables, one of which is attached fixedly to the bicycle frame and the other of which goes to the gearshift lever. This latter cable may actually be two cables joined by a turnbuckle to enable adjustment to a desired cable length. A spring attached to a gearshift lever and anchored to another frame portion provides a counter pressure against which the pedal pressure as transmitted to the drive chain is pitted. An increase in pedal pressure tends to pull down the shift-control wheel, which then exerts pull on the cable and moves the gearshift lever rearwardly, while a release of the chain and easy going lets the spring pull the shift lever forward and raise the shift-control wheel up higher.

BRIEF DESCRIPTION OF THE DRAWINGS

In the drawings:

FIG. 1 is a view in side elevation of a bicycle with standard change-speed gears comprising a standard derailleur and a standard manual shift lever and also provided with an automatic gearshift apparatus embodying the principles of this invention. The bicycle is shown in its highest speed gear.

FIG. 2 is a fragmentary enlarged view in side elevation of the shift-controlling wheel of FIG. 1 engaging the drive chain and connected to the two cables that control its position.

FIG. 3 is a view in section taken along the line 3—3 in FIG. 2.

FIG. 4 is a fragmentary enlarged view in side elevation of the gearshift lever of FIG. 1, moved to low gear position and showing the spring and cable attachments according to the principles of the present invention.

FIG. 5 is a view in side elevation of the bicycle in FIG. 1 shown on a smaller scale than in FIG. 1 and in its lowest gear.

FIG. 6 is a rear end view of the gearshift arrangement at the rear derailleur.

DESCRIPTION OF A PREFERRED EMBODIMENT

FIG. 1 shows a bicycle 10 having a frame 11, a front wheel 12, and a rear wheel 13. A main drive sprocket wheel 14 is provided with a pair of pedals 15 and 16 in the usual manner and engages a drive chain 17 which passes rearwardly toward a hub 18 on the rear wheel 13 where it engages one of a set 20 of sprocket gears of different size, providing various gear speeds available on shifting. For example, there may be five such sprocket gears 21, 22, 23, 24, and 25 and each of these is of a different diameter than the others. The largest diameter one is the lowest gear 21, and the smallest diameter one is the highest gear 25. The actual sprockets are usually the same distance apart on all these gears, so that if the chain 17 engages the smallest diameter gear 25, the ratio from the drive sprocket wheel 14 to that gear 25 is the greatest ratio, whereas the largest sprocket gear 21 may be substantially the same size as the drive sprocket wheel 14.

The shifting is controlled by a shift lever 30 connected by a cable 31 to a derailleur 32 which comprises a stationary bracket 33, a swinging spring-mounted bracket 34, and a cage 35. The cage 35 includes two wheels 36 and 37 which may or may not carry sprockets. The cable 31 and the spring mounted bracket 34 act on the cage 35 to move the cage 35 laterally and at the same time to move the wheels 36 and 37 to increase or relax the tautness of the chain 17 according to the gear onto which the chain 17 is shifted. Thus, the smallest sprocket gear 25 is on the outside and in shifting to it, the bracket 34 must move the rear part of the drive chain 17 to the outside with the aid of the cage 35, while at the same time, in order to make up for the smaller size of the sprocket gear 25, it must tighten the chain 17, which it does by moving the position of the two wheels 36 and 37 relatively to each other.

All this is left unchanged by the present invention, which adds to it the novel automatic shift control. Thus, a shift-control wheel 40 is rotatably supported in engagement with the upper reach of the drive chain 17 by a pair of cables 41 and 42 which are secured, respectively, to brackets 43 and 44, which support the shift-control wheel 40 for free rotation. A single continuous cable could be used in place of the two cables 41 and 42, but that creates some problems in the ease of manufacture and of operation. The cable 41 is attached to a rearwardly and downwardly extending portion 45 of the bicycle frame 11, which extends to and supports the rear wheel 13. The shift-control wheel 40 may be an idler, but is preferably a sprocket wheel, as shown.

This steadying cable 41 limits the shift-control wheel 40 to up-and-down movement instead of letting it move back and forth. The other cable 42 goes vertically upwardly from the wheel 40 and then passes through a right angle elbow tube 46, which may be supported by the frame 11 approximately under the bicycle seat 47. The tube 46 enables the cable 42 to turn the right angle smoothly, being curved for that purpose, so that the cable 42 slips readily through the tube 46 as the wheel 40 goes up and down. The cable 42 comes out of the tube 46 horizontally and runs horizontally toward the gearshift lever 30. It could go there for direct attachment, but preferably, it is attached at this point to a turnbuckle 48. The turnbuckle 48, which alternately may be secured vertically between two sections of the cable 42 or connecting the cable 42 to the bracket 44, may be a conventional type of turnbuckle and is used to obtain the desired tension on the spring 51 attached to the gearshift lever 30. The other end of the turnbuckle 48 is connected by another cable 50 to the gearshift lever 30 and a spring 51 connects the gearshift lever 30 to a bar 52 that is secured to the frame 11 and extends ahead of the gearshift lever 30. This bar 52 may be welded to the outside of the bicycle frame, or the manufacturer may simply make the bar in that manner or provide it with a projecting portion. A slot 53 (FIG. 4) is provided in the gearshift lever 30, and the spring 51 and the cable 50 are attached, as by bolts 54 and 55. The bolts 54 and 55 can move in the slot 53 and then be tightened within the slot 53 at the proper location, in order to obtain adjustment. Since bicycles vary as to the amount of room available for the shift-control wheel 40 to move, this enables adaptation to different bicycles. When made by a manufacturer, this feature may be eliminated for any particular model.

The turnbuckle 48, when used, is tightened so that the drive chain 17 passes just over the shift-control wheel 40 when the gearshift lever 30 is down and the bicycle is in its lowest gear, that is, engaging the sprocket gear 25 as in FIG. 5. As the gearshift lever 30 is raised, placing the bicycle in a higher gear, the wheel 40 pulls up on the sprocket chain 17 as shown in FIG. 1, where the bicycle is driven through its highest gear 21.

When the bicycle 10 is at rest with no effort on the pedal, the spring 51 holds the gearshift lever 30 in its high position. As the pedal pressure is applied, the slack is pulled out of the sprocket chain 17, pulling the cable 42 and the gearshift lever 30 down to shift the bicycle into a lower gear. As less effort is applied to the pedal, the pressure of the spring 51 is greater than the tension on the sprocket chain 17, and the shift-control wheel 40 is pulled back up again, returning the bicycle to a higher gear.

In a ten-speed bicycle the gears that shift are the back five. When going from the first set of the five gears to the second set in a ten-speed bicycle, a gearshift lever on the left side of the bicycle is used manually. On a five-speed bicycle all five gears can be shifted automatically.

The gears do not shift when the rider is coasting because the drive chain 17 must be moving order for the gears to shift.

It will be apparent that the gearshift lever may be placed in a different location, that some of the cables can go inside the frame, that springs may be interposed to the cable 42 or 50, that guards and guides may be added, and that some parts could be reversed without affecting the general principles of the invention.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An automatic gearshift device for a bicycle having a set of sprocket gears of different diameter and the same sprocket spacing on the hub of the rear wheel of the bicycle and having a drive chain going from a pedal driven drive sprocket wheel to the set of sprocket gears and having a manual gearshift lever mounted on the frame and connected by a cable to a derailleur for moving the drive chain from one sprocket gear to another, comprising:

a shift-control wheel in engagement with said drive chain, flexible means anchoring said shift-control wheel to the frame, cable means attaching said shift-control wheel to said gearshift lever, to exert a pull in one direction on the gearshift lever, and spring means anchored to said frame and attached to said gearshift lever for urging said gearshift lever in the opposite direction.

2. The device of claim 1 wherein said cable means comprises an elbow like guide means guiding said cable means generally vertically upwardly from said shift-control wheel and generally horizontally to said gearshift lever.

3. The device of claim 2 wherein said cable means includes a turnbuckle.

4. The device of claim 2 wherein said cable means comprises two cables connected by a turnbuckle.

5. The device of claim 4 wherein said turnbuckle lies where the cable means is generally horizontal.

6. The device of claim 1 wherein said shift-control wheel is a sprocket wheel.

7. An automatic gearshift device for a bicycle having a set of sprocket gears of different diameter and the same sprocket spacing on the hub of the rear wheel of the bicycle and having a drive chain going from a pedal driven drive sprocket wheel to the set of sprocket gears and having a manual gearshift lever near the handlebars of the vehicle mounted on the frame and connected by a cable to a derailleur for moving the drive chain from one sprocket gear to another, comprising:

a shift-control wheel in engagement with the lower surface of the upper reach of the drive chain, first cable means anchoring said shift-control wheel to the frame, second cable means attaching said shift-control wheel to said gearshift lever to exert a rearward pull thereon, and spring means anchored to said frame and attached to said gearshift lever for urging said gearshift lever forwardly.

8. The device of claim 7 wherein said second cable means includes a frame-supported elbow tube guiding said second cable means vertically upwardly and then around a curve to a horizontal path leading to said gearshift lever.

9. The device of claim 8 wherein said second cable means includes a turnbuckle.

10. The device of claim 9 wherein said turnbuckle lies in said horizontal path connecting two cables comprising said second cable means.

11. The device of claim 7 wherein said gearshift lever is slotted and said spring means and said second cable means are bolted to said lever along said slot.

12. The device of claim 7 wherein said shift-control wheel has sprockets engaging said drive chain.

References Cited
UNITED STATES PATENTS
3,492,883    2/1970    Maeda _____ 74—217 B LEONARD H. GERIN, Primary Examiner